Oct. 18, 1927.                              1,646,094
L. V. HOUGHTON
VEHICLE TAIL LAMP
Filed Dec. 27, 1926      2 Sheets-Sheet 2
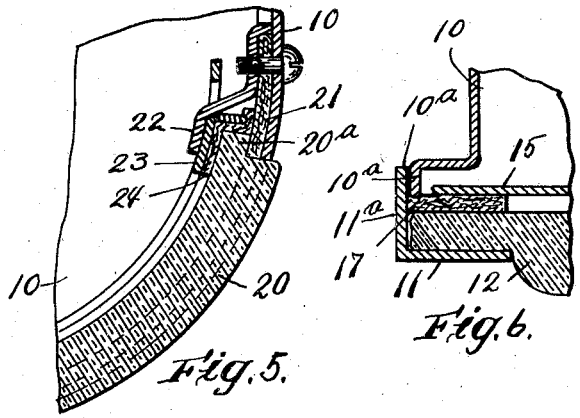
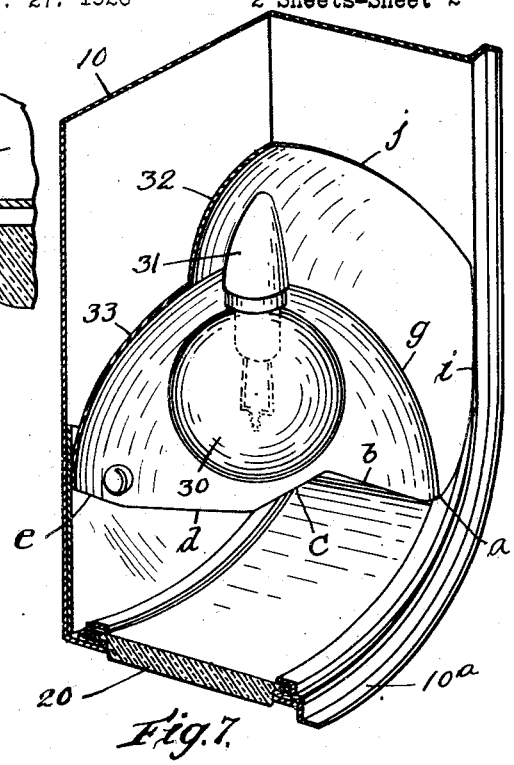
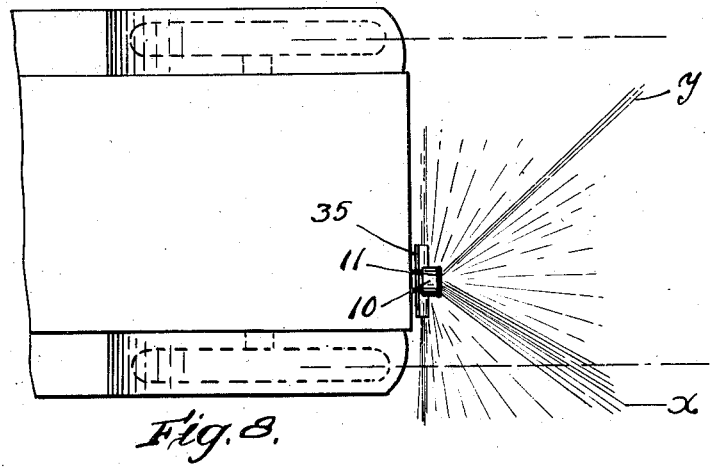
Inventor,
Leroy V. Houghton
by L. H. Hammann
Atty.

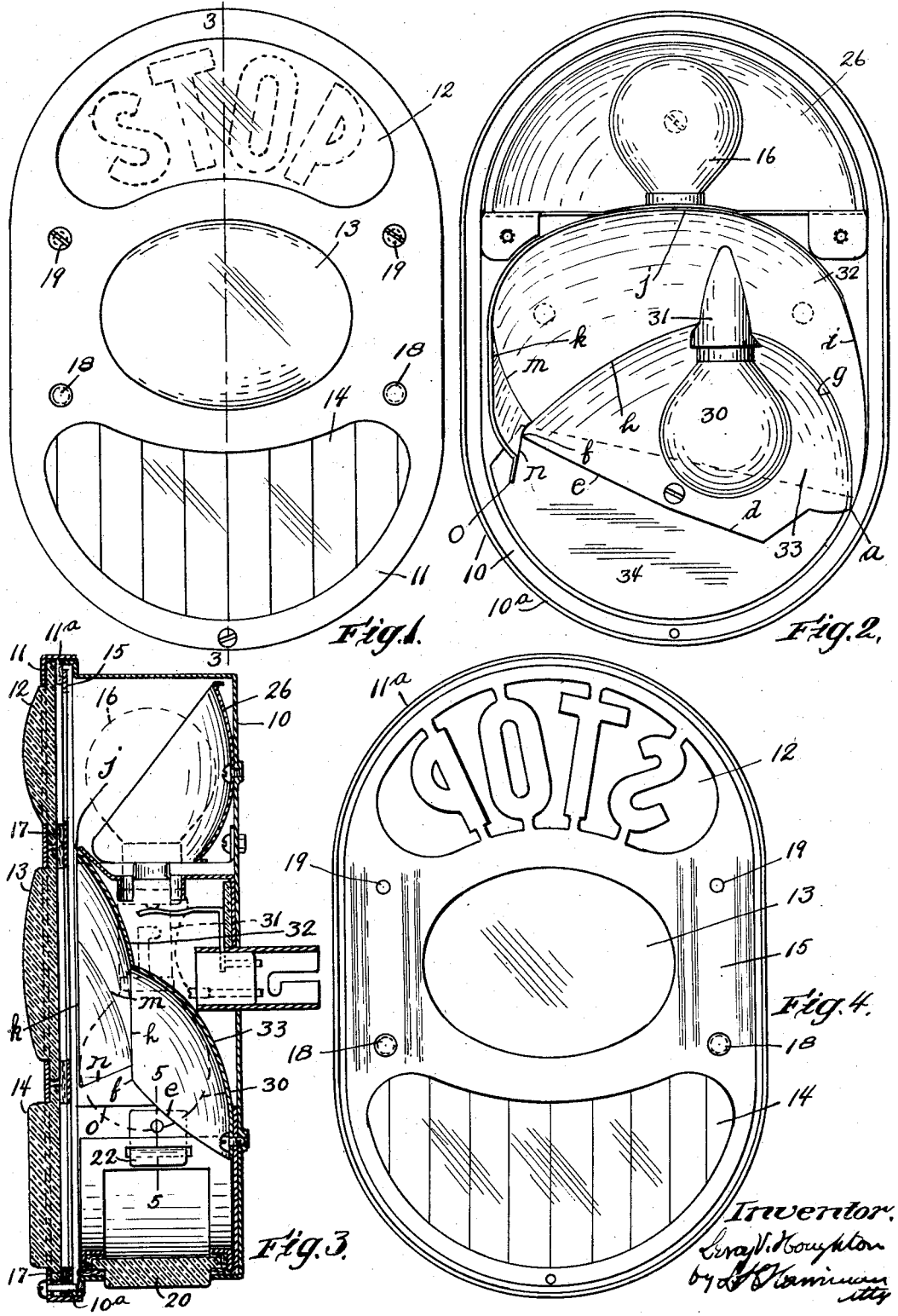

Patented Oct. 18, 1927.

1,646,094

UNITED STATES PATENT OFFICE.

LEROY V. HOUGHTON, OF HAVERHILL, MASSACHUSETTS.

VEHICLE TAIL LAMP.

Application filed December 27, 1926. Serial No. 157,025.

This invention relates to that class of lamps for automobiles which are generally known as "tail lights," the primary purpose of which has been to illuminate the rear number plate and to show a fixed red signal light at the rear end, such lamps being sometimes combined with so called "stop" lights, which are automatically operated from the brake lever.
With a device of this character, it is not only desirable to provide sufficient illumination of the number plate, but it is also desirable to illuminate the rear end of the car to which it is attached, and also the road directly in the rear thereof and at the left, so that, when another car passes there will be less danger of collision, and when it is desired to drive the car backward, the way will be sufficiently lighted. A common defect of devices of this character is that they are not dust proof, so that the lenses, reflectors and lamps thereon become partly or wholly ineffective.

The objects of my invention are to provide a form of tail light which is not only adapted to illuminate the number plate clearly and perform all the functions of similar devices now or generally in use, but will also sufficiently illuminate the rear end of the automobile to which it is attached, and will throw concentrated rays of light in several directions to the road surface directly in the rear and to one side thereof.

Further objects are to provide a construction for the above described purposes which may be manufactured at a low cost, as compared with devices of like character, and which will also be practically dust proof, so that the efficiency of the reflectors and lenses will not be impaired by long continued use.

I accomplish these objects by means of the construction illustrated in the accompanying drawings in which:

Fig. 1 is a front elevation of a preferred embodiment of the invention.

Fig. 2 is a similar view with the front or cover plate removed.

Fig. 3 is a sectional view at line 3—3 of Fig. 1.
Fig. 4 is an elevation of the inner side of the cover plate, with the back plate thereon.

Fig. 5 is a detail sectional view, at line 5—5 of Fig. 3, of the means for securing the bottom lens in position in the casing.

Fig. 6 is a detail sectional view at line 3—3 of Fig. 1.

Fig. 7 is a detail perspective view of the interior of the lower portion of the casing being a section, at approximately the line 3—3 of Fig. 1.

Fig. 8 is a plan view indicating the action and location of the device when in use.

As shown in the drawing the device comprises a main casing 10, which is stamped out of sheet metal in a somewhat oblong form, the bottom or back thereof being flat and the sides being perpendicular thereto. The sides are semi-circularly formed at each end, such portions forming the top and bottom of the casing. A front plate 11 is provided, having three openings therein in which lenses 12, 13 and 14 are inserted, and are held therein by edge flanges which engage the inner sides of the plate. The top and middle lenses 12 and 13 are formed of red glass and the bottom lens 14 of white glass and said lenses are held in position to the plate 11 by means of a back plate 15, which has openings therein corresponding to the openings in plate 11, except that the portion in the rear of the top lens 12 is cut to form the word "Stop," so that when the lamp 16, in the rear thereof, is illuminated, this word will appear. A packing sheet 17, preferably of pressed cork, is provided between the plates 11 and 15, said sheet having openings corresponding to the lens openings in the front plate 11 and being adapted to fit closely within an edge flange 11$^a$ on plate 11, so that the openings register. The area of the back plate 15 is made somewhat less than that of sheet 17, so that the latter extends slightly beyond the edge of said plate. The plates 11 and 15, with the sheet 17 therebetween are clamped together in this position by rivets 18, so that the openings in which the lenses are located are made dust tight. A flange 10$^a$ is formed on the edge of the walls of the casing over which the edge flange 11$^a$ of the front plate is adapted to fit closely, the edge of flange 10$^a$ being also adapted to seat on the edge portion of packing sheet 17, as shown in Fig. 6. The plates 11 and 15, with sheet 17 clamped therebetween are secured in this position by bolts 19, which pass through plate 11 into the back of casing 10, so that the entire front of the casing is tightly closed against the entrance of dust.

The lower curved portion of the side wall of the casing, or bottom, is provided with a rectangular shaped opening to receive a correspondingly curved lens 20, having an edge flange 20ª and to secure said lens in position and provide a dust tight closure for the opening a packing, or gasket 21, of sheet cork or felt is provided between the inner side of the casing about the opening and the flange 20ª and the latter is clamped thereagainst by a clamping bracket 22, secured to the casing at each end of the lens, which engages a metal frame 23 on the back side thereof, between which and the frame 23 a cushioning sheet 24 is preferably interposed, as shown in Fig. 5.

The inner surface of the casing is finished to provide reflecting surfaces at all points not shielded by reflectors, as hereinafter described. A reflector 26 is provided in the rear of lamp 15, which is arranged to illuminate the stop light lens only, and is operated in the usual manner, the lamp 16 being held in a socket 27, supported by a partition 28 and suitable electrical connections thereto being provided, the arrangement being such that the lamp 16, when lighted, illuminates the top lens 12 only.

The intermediate and lower front lenses 13, 14 and the bottom lens 20 are illuminated by a lamp or light bulb 30 mounted in a socket 31, which is fixed in a reflector 32, the socket being so arranged that the lamp depends from the reflector 32 in a position at the right of the middle of the casing, as shown in Fig. 2. A reflector 33 is also provided directly in the rear of the lamp 30 and extends obliquely from points at the right hand side of the casing at the adjacent end of the bottom lens 20 obliquely upward and towards the front and to the left in concave formation. The lower edge of the deflector 32 is joined to upper edge of reflector 33 and they may be formed from a single sheet of metal.

To describe said reflectors 32 and 33 more specifically, as shown in Figs. 2, 3 and 7, the extreme right hand corner a of the reflector 33 is located close to the front right hand corner of the rectangular shaped opening, in which the bottom lens 20 is held, and, from this point its lower edge portion b extends close to the end edge of this opening and the side of the casing nearly to the rear edge of the opening and the edge portion c extends from this point obliquely to the back of the casing, from which point edge portion d extends close to the casing back, at a slight upward inclination, to a point near the longitudinal middle line of the casing back. From this point the edge portion e extends towards the left side and towards the front, at a similar inclination, to the point f, near the left side. The top outline or edge of the reflector 33 forms a portion of the bottom outline or edge of reflector 32, the portion g thereof extending from point a upwardly and rearwardly and towards the left in a curved line to the right front side of socket 31, near its middle, and, continuing from an opposite point in the socket, the edge portion h extends in a plane approximately parallel to the front plate and in an oblique direction, to the point f near the left side of the casing. The reflector 33 thus encloses the rear side of the light bulb 30, the main focal line thereof extending from a point about midway between the middle of the back and the right side thru the middle portion of lens 14, at an angle of approximately 45° to the front of the lamp, and downward at a similar angle to the horizontal.

As thus arranged, the strongest light ray thrown by the reflector 33, assuming the casing 10 is mounted on the rear of the automobile near its left side, will be directed in an oblique rearward and downward direction to the left thru the lower lens 14, as indicated in Fig. 8 by the dotted line x. The upper portion of the reflector 33 reflects light rays downward thru the bottom lens 20, to illuminate the number plate 35, and light rays of lesser intensity than those at or near the line x are directed thru the lens 14 at each side of said line.

The upper edge of reflector 32 is disposed in close proximity to the inner side of the back plate and its right hand upper edge portion i extends upward from a point near the point a, close to the right side of the casing, then divergently with relation to said side and in a curved line j, so that it extends nearly horizontally at the middle of the front, from which point it extends downward in a similar curve close to the left side. From this point the edge-portion k extends downward to a point near the level of the adjacent end of edge portion e of reflector 33, the upper part of portion k extending nearly parallel to the left side of the casing and the lower part thereof, extending somewhat divergently from said side. The whole surface of the reflector 32 is concave both vertically and horizontally and the left end portion thereof extends at an angle to the main portion thereof, the approximate vertex of the angle between these surfaces being indicated at line m. From the line n, which extends from the lower end of edge portion k to the lower end of line m, a supplemental reflecting portion o is formed, which depends nearly to the left end of the bottom lens 20 and in front of the adjacent portion of reflector 33.

As thus arranged the reflector 32 projects light rays from bulb 30 in several directions, the main portion thereof being arranged to illuminate the red middle lens 13, so that this lens will be sufficiently illuminated at all times to provide a red signal light.

The portion of reflector 32 between the middle thereof and the line m and adjacent the latter is arranged to project concentrated light rays downward thru the lens 14 at an angle of approximately 45° to the horizontal and also at a similar angle to the middle vertical plane of the casing, in a direction approximately indicated by dotted line y in Fig. 8, light rays of lesser intensity being projected from the reflector at each side of said line. The portion of the socket 31 which extends beyond the reflector 32 is not sufficiently illuminated directly from bulb 30 to project light to the lens 13, and, to prevent a shadow appearing on the lens, due to the presence of this socket, the left end portion of reflector 32, beyond line m, is arranged to project light rays from the bulb onto said socket so as to illuminate the same. Sufficient light will be reflected from the socket surface, which is finished similarly to the reflector surfaces, to illuminate the portion of the lens 13 which would otherwise be in shadow. The depending reflector portion o intercepts light rays which would otherwise be absorbed by the side of the casing and directs them thru the bottom lens 20.

The back of the casing below the reflector 33 is provided with a reflecting surface 34 which reflects the light rays thru the lower front lens 14.

With the above described construction, the number plates supported beneath the casing will be thoroughly illuminated by light passing thru the bottom lens 20, to a large extent directly from the bulb 30, and also indirectly from reflector 33.

The roadway in the rear of the automobile will be sufficiently illuminated to enable backward driving and will be strongly illuminated at the left and in the rear, so that danger of collision with passing automobiles will be reduced. As the bottom wall portion is rounded and the opening for lens 20 extends nearly to the vertical portion of the sides, light passing therethru illuminates the rear end of the automobile, as well as the number plate.

With the above described construction it will be apparent that, by means of the several reflectors shaped and arranged as described, a single lamp provides constant illumination for a fixed red light signal, for the number plate and lower portion of the rear end of the automobile, and for the roadway in the rear of the automobile, the roadway at the rear and to the left being particularly well illuminated. None of the concentrated white light rays are directed in a direction which would dazzle the eyes of the driver in a car following.

The construction is adapted to meet the requirements of a low manufacturing cost and the particular means described for making the casing dust tight do not seriously add to the expense, but greatly increase the efficiency for a long period of use.

I claim:

1. A vehicle tail-lamp comprising a casing having a lens opening in its bottom and having an upright front provided with two lens openings arranged one above the other, a light bulb mounted within the casing over said bottom opening, in the rear of said front openings and to the right of the middle vertical plane of the casing, a lower reflector arranged in the rear of said bulb, in oblique relation to said plane, and in position to project concentrated rays of light from the bulb obliquely downward and through the lower front opening and to the left of the casing and an upper reflector arranged to project light from the bulb through said upper opening.

2. A vehicle tail-lamp comprising a casing having a bottom with a lens opening therein, and a vertical front and back, said front having two lens openings one over the other, a light bulb located within the casing, over said bottom opening and in the rear of the lower portion of the upper opening and of the upper portion of the lower opening and at the right of the vertical plane at the middle of said front and back, a lower reflector arranged within the casing in the rear, at each side of and above the light bulb, with its opposite portions diverging from points above and to the right thereof and in position to project concentrated light rays therefrom obliquely downward and to the left through said lower opening and an upper reflector extending in continuation of the lower reflector and arranged to project light rays from the bulb through the upper opening, to effect illumination of the lens therein.

3. A vehicle tail-lamp comprising a casing having a lens opening in its bottom, an upright front having two lens openings therein arranged one above the other and a socket within the casing having a lamp bulb therein and arranged to support the bulb in a depending position at the right of a verticle plane perpendicular to the front at its middle and over said bottom opening, a lower reflector supported in the casing and extending from the front at the right of the bulb to the rear thereof and towards the front at the left side through said plane in position to direct concentrated light rays obliquely downward and to the left through the lower lens opening, and an upper reflector having its lower edge meeting the upper edge of the lower reflector at an angle and arranged about said socket in position to direct light rays from the bulb through the upper opening, to provide uniform illumination of the lens therein.

4. A vehicle tail-lamp comprising a casing having a lens opening in its bottom and two lens openings, one directly above the other, in the front of the casing, a lamp bulb supported in the rear of said front openings at the right of a vertical plane perpendicular to the front at the middle thereof, a lower reflector arranged to project light from said bulb through the lower front opening, obliquely to said plane and downward and obliquely to the horizontal, an upper reflector having a main portion arranged to project light through said upper front opening and having a supplemental portion at the left end thereof arranged to project light from the bulb obliquely downward to the right and through the lower front opening.

5. A vehicle tail lamp comprising a casing having a pair of lenses in the front thereof arranged one above the other, a single light bulb mounted within the casing in the rear of said lenses, and a pair of reflectors arranged in the rear of said bulb one above the other, the lower reflector being arranged to project concentrated light rays from the bulb obliquely downward thru the lower lens and to the left of the casing and the other reflector being arranged to project light rays from the bulb thru the upper lens.

6. A vehicle tail lamp comprising a casing having a pair of lenses in the front thereof arranged one above the other, and a single light bulb mounted within the casing in the rear of said lenses and a pair of reflectors arranged in the rear of said bulb, one above the other and having their adjacent portions meeting to provide a substantially continuous reflecting surface, the lower reflector being arranged to project concentrated light rays obliquely downward thru the lower lens and the upper reflector being arranged to project concentrated light rays thru the upper lens.

7. A vehicle tail lamp comprising a casing having a pair of lenses in the front thereof arranged one above the other, and a single light bulb mounted within the casing in the rear of said lenses, a plurality of reflectors arranged in the rear of said bulb and having their adjacent portions meeting to provide substantially continuous reflecting surfaces arranged to project concentrated light rays from the bulb, one in a direction obliquely downward and to the left thru the lower lens, another in a direction obliquely downward thru the lower lens and to the right and another in a direction thru the upper lens.

8. A vehicle tail lamp comprising a casing having a pair of lenses in the front thereof arranged one above the other, and a single light bulb mounted within the casing in the rear of said lenses and somewhat at the right of the middle of the casing, a pair of reflectors arranged in the rear of the bulb, the lower reflector being arranged with its middle portion at the right of the middle of the casing and in position to project a beam from the bulb downwardly rearwardly and to the left thru the lower lens and the upper reflector being arranged to project a beam from the bulb through the upper lens and a supplemental reflector arranged at the left of the middle of the casing in position to project a beam from the bulb thru the lower lens obliquely downward and to the right.

In testimony whereof, I have signed my name to this specification.

LEROY V. HOUGHTON.